Figure 1:
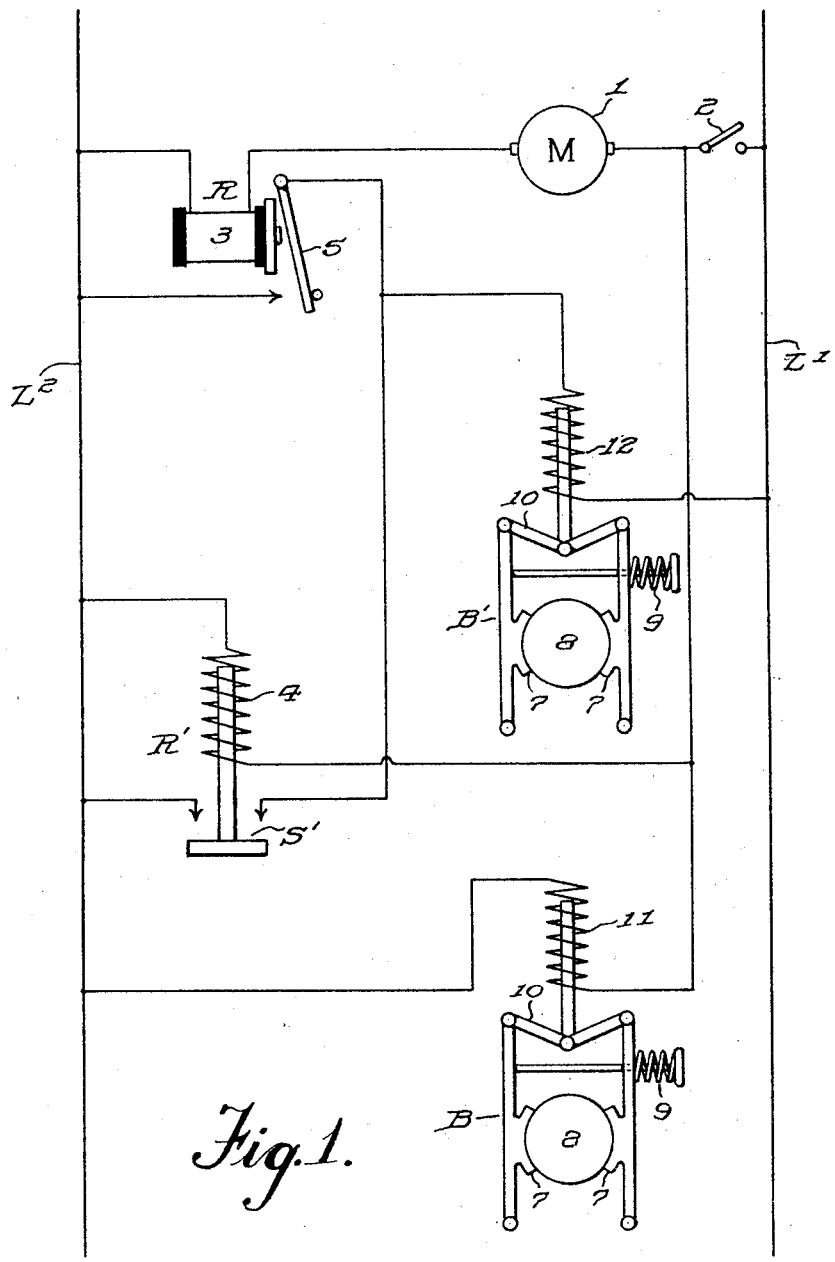

April 11, 1933.  W. H. MECHLING  1,903,550
ELEVATOR BRAKING SYSTEM AND METHOD OF ACTUATING THE SAME
Filed Jan. 22, 1929  2 Sheets-Sheet 1

INVENTOR
William H. Mechling.

WITNESS

April 11, 1933. W. H. MECHLING 1,903,550
ELEVATOR BRAKING SYSTEM AND METHOD OF ACTUATING THE SAME
Filed Jan. 22, 1929 2 Sheets-Sheet 2

INVENTOR
William H. Mechling.

WITNESS

Patented Apr. 11, 1933

1,903,550

UNITED STATES PATENT OFFICE

WILLIAM H. MECHLING, OF WHITEMARSH, PENNSYLVANIA, ASSIGNOR TO ATLANTIC ELEVATOR COMPANY, INC., OF PHILADELPHIA, PENNSYLVANIA, A CORPORATION OF PENNSYLVANIA

ELEVATOR BRAKING SYSTEM AND METHOD OF ACTUATING THE SAME

Application filed January 22, 1929. Serial No. 334,150.

Broadly considered, my invention relates to methods of and means for arresting the rotation of a shaft under varying conditions of load and more especially concerns methods of and means for applying a braking force to the main driving shaft of an elevator.

As is well known, an elevator is ordinarily subjected to varying conditions of load and, in consequence, a braking mechanism exerting a non-variable torque upon the driving shaft is subject to undesirable fluctuations in its effectiveness in bringing the car to a stop at a desired point. It has therefore long been a problem in the elevator art to provide an effective means of stopping the car at the desired floor level in those elevators where the main power circuit is broken either manually or automatically when the car reaches a certain predetermined position in the hatchway adjacent the floor at which it is desired to stop, this difficulty being largely due to the fact it has heretofore been impossible to provide braking means satisfactorily operative for this purpose under the variable load conditions encountered; my invention is therefore directed chiefly to the solution of this problem.

The customary elevator equipment includes, among other things, a main or service brake, a driving motor and a counterweight whose mass is somewhat greater than the mass of the empty car, usually being equal to the mass of the latter plus about 40% of the maximum car load. This counterweight is used to limit as closely as possible the power needed to move the car, the maximum power being required both when raising the car fully loaded and lowering the car unloaded, the minimum power being required when raising the car unloaded or lowering the car fully loaded, and the mean or average power being required when the car is carrying about one-half its maximum load. It is thus apparent that when the power required lies between the mean and the minimum, the force of gravity is assisting the work of the driving motor or other power source and therefore the braking force required to bring the car to a stop in a given distance under this condition is greater than when gravity is acting in opposition to the driving motor as when the power required by the latter lies between the mean and the maximum.

It is therefore a principal object of my invention to provide an auxiliary brake to supplement the braking action of the main brake when necessary or desirable and particularly when the power required for the operation of the driving motor lies between the mean and minimum requirements to which I have referred, since it is apparent that a main brake of proper capacity needs no such assistance when its braking force is being supplemented by gravity, that is, through that range of power requirement which lies between the mean and the maximum and during which the force of gravity is effective to resist the motion of the car.

A further object of the invention is to provide in an elevator braking system an auxiliary brake adapted to supplement the main brake under certain conditions together with means for actuating the auxiliary brake in correspondence with the power requirements of the driving motor and, more particularly, in such manner that when the amount of current drawn by the driving motor from the power line is relatively small, the auxiliary brake will supplement the action of the main brake in bringing the car to rest and when the current drawn is relatively large, the auxiliary brake will be maintained inoperative and the main brake alone utilized for that purpose.

A still further object of the invention is the provision of a novel method of operating an auxiliary brake in an elevator braking system in accordance with the amount of current drawn by the driving motor of the system from the source of current supply, as well as the provision of means and instrumentalities in an elevator braking system effective for the performance of the said method.

Other purposes, objects, advantages and novel features of construction and arrangement comprehended by my invention will hereinafter more fully appear.

Figure 2:
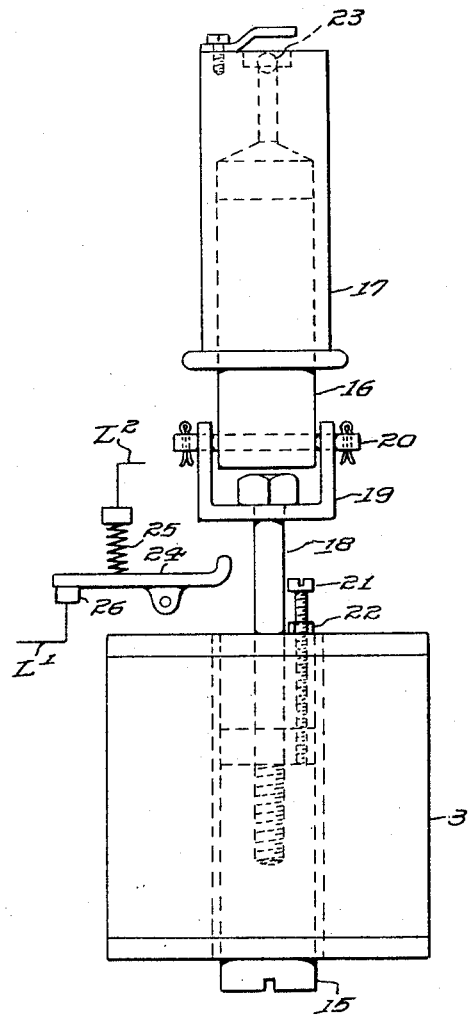

To enable those skilled in the art to comprehend and practice the invention, I have diagrammatically illustrated in Fig. 1 in the accompanying drawings and will now proceed to describe, an elevator braking system embodying the principles of my invention and constructed and arranged in accordance therewith, while in Fig. 2 I have shown, somewhat diagrammatically, a form of retarded relay which may desirably be used as a component element of the braking system.

In the said drawings $L^1$ and $L^2$ represent the leads of the main power line which is the source of power for both operating the elevator car (not shown) and for actuating other devices hereinafter described. The driving motor 1 which is suitably arranged to raise and lower the car in the usual way, is connected across the leads $L^1$, $L^2$ in series with the potential switch 2 by which the starting and stopping of the motor is also effected in the usual way, and the solenoid coil 3 of a retarded relay R, desirably of the type shown in Fig. 2. Connected in parallel with the motor 1 and the solenoid 3 are the solenoid 4 of an auxiliary relay R' and the solenoid of the main service brake B. It will be understood that the brake B and the auxiliary brake B' hereinafter mentioned may be of any convenient or desired type, for example and as is usual, one comprising a pair of friction shoes 7 urged towards a drum 8 by a spring 9 and adapted to be released by a toggle 10 actuated by a solenoid 11 in the case of brake B and by a solenoid 12 in the case of brake B' as diagrammatically represented in Fig. 1; the brake drums are, in practice, usually mounted upon the motor shaft although their position in the diagram is otherwise for the sake of clearness. It will thus be understood that when either brake solenoid is energized and the solenoid plunger thus drawn thereinto, the toggle with which the plunger is connected is straightened so as to maintain the brake shoes out of engagement with the brake drum in opposition to the spring 9, and that when the solenoid is de-energized so as to release the toggle, the spring becomes immediately effective to press the shoes against the drum and thus apply the brake. As brakes of this general construction are in common and well understood by those familiar with the elevator art further description thereof would be superfluous, particularly as any form of electrically controlled brake may be employed.

The solenoid 12 of the auxiliary brake B' is connected across the power lines $L^1$, $L^2$ and in series with the switch S of the retarded relay R which may desirably be of a dash-pot type, while in parallel with the switch S and also in series with the solenoid 12 is the switch S' of the auxiliary relay R', the switch S' being actuated by the solenoid 4 and so arranged that when the latter is energized the switch S' remains closed but when the solenoid 4 is de-energized the switch remains open.

Reference will now more particularly be made to the construction of the dash-pot or retarded relay R which is best shown in Fig. 2 and which I prefer to employ although other forms of relays or equivalent devices may be utilized for the accomplishment of its intended function if desired. Thus as shown, this relay comprises a solenoid 3, already referred to and an armature 15 adapted to move within the coil of the solenoid and connected to a piston 16 of a dash-pot 17 by a rod 18, yoke 19, and pin 20. The rod 18 is threaded into the armature 15 so that the distance between the armature and the piston may be adjusted by varying the distance which the armature is screwed onto the rod, while to limit the distance the armature may travel when acted upon by the magnetic force of the solenoid 3, I extend an adjustable screw 21 through the head of the solenoid; this screw can be secured in any desired position of adjustment by a lock-nut 22. The dash-pot is desirably provided with a ball or other check valve 23 at its closed end so arranged that on the inward movement of the piston 16, the fluid in the dash-pot can escape therefrom more readily than it can be drawn thereinto on the reverse movement of the piston.

Adjacent the yoke 19 is arranged a pivoted switch arm 24 in association with a spring 25 which tends to maintain the switch arm in contact with a contact piece 26 so as to close the circuit between the main power lines $L^1$, $L^2$ with which the arm and the contact piece are respectively connected, the arrangement being such that when the switch arm engages the contact piece the circuit through the solenoid 12 of auxiliary brake B' is completed. The switch arm 24 is so disposed and arranged that it extends into the path of the yoke 19 in such a way that when a sufficiently strong current passes through the solenoid 3 of the relay to move the armature 15 toward the end of the adjusting screw 21, the yoke is disengaged from the switch arm 24 and the latter under the action of the spring 25 operates to close the circuit between $L^1$, $L^2$, but in the absence of a current in the solenoid 3 strong enough to thereafter hold the yoke out of engagement with the arm 24, the yoke returns towards initial poistion and through engagement with the switch arm holds the latter out of contact with the contact piece 26 to keep switch S open. I prefer to so construct the dash-pot relay that the force of gravity will oppose the force of the solenoid; thus when the solenoid is de-energized, the weight of the armature 15, piston 16 and other parts attached to them will cause the switch arm 24 to be raised so as to open the switch S, although other means for effecting this result may of course be employed.

Reference will now be made to the operation of an elevator braking system of the character of that heretofore described: Assuming, without regard to load conditions, that the elevator is stationary in the hatch, the switch 2 open and the brakes B, B' both in engagement (which is the normal position of these parts when the car is at rest) and that it be desired to raise or lower the car, the switch 2 is first closed in the usual way thus closing the following circuits (a) through the driving motor 1 and solenoid 3 of the dashpot relay R; (b) through the solenoid 4 of the auxiliary relay R'; (c) through the solenoid 11 of the main service brake B. The effect of the closing of these circuits is as follows: Through circuit (a) to start the motor 1 and energize the solenoid 3 of the dash-pot relay R thereby closing switch S to complete the circuit through solenoid 12 with which it is in series, thus releasing the auxiliary brake B'. Through circuit (b) to energize the solenoid 4 and immediately close the switch S'. Through circuit (c) to energize the solenoid 11 and thus release the main service brake B. The motor, being now free to move, following the release of the brakes B, B' as thus described, draws the car up or down in correspondence with its direction of rotation as controlled by the switch 2 in conjunction with the usual direction switches (not shown) in the ordinary way.

It will be readily understood that since considerably more power is normally required to start the driving motor than is required to keep it in motion after its initial acceleration from a state of rest, the switch S will always close upon the closing of the switch 2 to start the motor and the importance of this fact will hereinafter more fully appear. However immediately after the initial acceleration of the motor 1, there is a considerable current drop through the motor and the solenoid 3 of relay R; thus by adjusting the screw 21 and the effective length of the rod 18, it is possible to so control the action of the solenoid 3 upon the armature 15 that when the current flowing through the solenoid falls below a certain predetermined point, the solenoid will no longer exert upon the armature a force sufficiently great to hold the latter against the screw 21 and the armature will therefore fall away from the screw, this action being somewhat delayed by the dash-pot 17; while this delay is of no particular importance under the conditions just described, namely while the current continues to flow through the driving motor and the solenoid 3, it is apparent that this delayed action will also occur upon the breaking of circuit (a) when the current has been strong enough to hold the armature 15 against the screw 21 and under this latter condition the delay is extremely important for a reason hereinafter pointed out. As the armature falls away from the screw 21, the yoke 19 engages the switch arm 24 and opens switch S. Switch S', however, remains closed so long as current is flowing through the switch 2 and the solenoid 4, so that the opening of the switch S, the switch 2 being closed, does not de-energize the solenoid 12.

Let us assume, now, that either a light load is to be raised or a heavy load is to be lowered; as above observed, this condition requires a driving power less than the mean, and a braking power greater than the mean to stop the car at a given point in a given distance when the car is travelling at a given speed. To start the car under these conditions the switch 2 is closed in the usual way thus starting the motor which, as above described, momentarily draws a relatively heavy current while it is accelerating, thereby closing switch S of the relay R, but as soon as the car reaches its ordinary speed the current drawn by the motor falls below the mean so that when the rod 18, armature 15 and screw 21 are properly adjusted, the solenoid 3 through which this relatively low current is now flowing exerts insufficient power to maintain switch S closed; thus while switch S is momentarily closed while the car is being started and during the subsequent acceleration of the motor, it is automatically opened very shortly thereafter and remains open until the car is again started from a state of rest. When it is desired to stop the car, the switch 2 is opened thus de-energizing motor 1, solenoid 11 and solenoid 4. The deenergization of solenoid 11 permits the main brake to engage in the drum while the de-energization of the solenoid 4 opens switch S' thereby breaking the circuit through solenoid 12, the switch S being already open, to permit brake B' to function and thereby assist brake B in stopping the car, both brakes being thus applied substantially simultaneously.

However when a heavy load is being raised or a light load is being lowered, a relatively large current is necessarily drawn by the motor throughout the movement of the car, so that a correspondingly heavy current continuously passes through the solenoid 3 thereby causing the solenoid to hold the armature 15 against the screw 21 and keeping switch S closed so long as the switch 2 is closed. Under these conditions of load only a relatively small braking power such as can be adequately supplied by the main service brake B alone is required to stop the car, and when the switch 2 is opened for that purpose the action of the several elements is similar to that just described except that switch S remains closed for a short interval, since the dash-pot prevents the armature 15 from immediately returning to lower position and thus opening the switch; thus the current between the main lines L¹ L² continues to flow through solenoid 12 thus maintaining the auxiliary brake B' in released position so long as the switch S is closed and, consequently, the service brake B is alone operative to stop the car. As under the assumed load conditions the service brake B requires only a short time to perform this function, the relay R may be so adjusted that after the lapse of a few seconds following the opening of the switch 2, the relay R will open switch S thus breaking the circuit through the solenoid 12 and applying the auxiliary brake B' very shortly after or just as the car comes to rest. This application of the auxiliary brake B' has no substantial effect, therefore, upon its movement but merely serves as an additional safe-guard against slippage in case of a defect or deficiency in the main service brake while the car is at rest.

It will be understood that as the position of the screw 21 and the position of the armature 15 on the rod 18 are desirably variable over a wide range, the parts may be readily adjusted to cause the auxiliary brake to assist in stopping the car upon the opening of the switch 2 under any predetermined conditions of current flow through the motor at the moment of the opening of that switch.

It will thus be apparent that I have provided an elevator braking system embodying a main service brake and an auxiliary brake in combination and association with means and instrumentalities whereby when the operating conditions are such that the main brake would be ineffective to stop the car in a given distance when traveling at a certain speed, the main brake is automatically supplemented by the auxiliary brake to thereby insure the stoppage of the car at the desired point after the opening of the switch 2 and consequent de-energization of the driving motor. Additionally, it will be observed that in accordance with the preferred practice of my invention, the auxiliary brake B' is always applied at least a short time after the car is brought to rest even though because of the particular operating conditions encountered it was not utilized in actually stopping the car. Thus whenever the car is at rest, both brakes are effective to resist any accidental car movement due to some defect in the operating mechanism or other cause while, moreover, as the switch S is always open either shortly before the car comes to rest, as in the case where the auxiliary brake is supplementing the main service brake in slowing the car, or shortly after the car has come to rest through the operation of the main service brake alone, all of the circuits between the power lines $L^1$, $L^2$ are maintained in open condition at least during the major portions of the time when the car is at rest so that no power is consumed and all danger of burning out the solenoid coils is avoided.

In the operation of elevators of the non-automatic type it frequently happens that the operator initially fails to stop the car exactly at the proper floor level and thereupon attempts to remedy the error by "inching" or "jockeying" the car by rapid manipulation of the starting switch so as to move it by small increments to the proper position. When the switch 2 is being operated in this manner the current is thrown on or off the motor more rapidly than the retarded relay R can open and close the switch S which therefore remains closed throughout such periods, so that the auxiliary brake B' is continuously held in non-operative position and the main brake B thus functions alone. As under these conditions and irrespective of its load the car is only moved through a relatively short distance and at a very slow speed, the main brake is entirely sufficient to control it; in fact were the auxiliary brake permitted to function and supplement the main brake, the braking action upon the car would be too severe in most cases with resultant roughness or jolting in the motion of the car.

Elevator braking systems constructed in accordance with my invention may be advantageously employed with numerous classes or types of electrically driven elevators; but are particularly desirable for use in connection with automatic elevators, much difficulty having heretofore been experienced with this class of elevators in insuring the stoppage of the car exactly at the desired floor level under the varying load conditions necessarily encountered in operation when, as is usual, the elevator is equipped with but a single service brake of sufficient capacity to control the car when maximum braking effort is required, while, additionally, the irregular, "jerky" operation and lack of smoothness during deceleration when minimum braking effort is required and which is almost invariably present when such a brake is employed, is entirely obviated by the use of my invention.

While I have herein described one form of my invention with considerable particularity, I do not thereby desire and intend to confine myself specifically thereto nor to any particular details in the design, construction and arrangement of the various elements employed, as numerous changes and modifications may be made therein with a view to adapting my improved braking system to various types and classes of elevators or for other purposes as may be desired without departing from the spirit and scope of the invention as defined in the appended claims.

Having thus described my invention, I claim and desire to protect by Letters Patent of the United States:

1. The combination with an electric motor, of braking means therefor normally effective to prevent rotation of the motor while the motor is de-energized, and a current relay in series with the motor adapted to effect the release of the braking means upon the passage of a current through the motor and adapted to maintain the braking means in released position for a predetermined period after interruption of the passage of the current through the motor.

2. The combination with an electric motor, of braking means for the motor normally disposed in braking position while the motor is de-energized, a current relay in series with the motor adapted to effect the release of the braking means upon the passage through the motor of a current of predetermined strength and to remain in brake-releasing position so long as said current is flowing through the motor and for a predetermined interval thereafter, and a second relay adapted to maintain said braking means in released position whenever a current of a strength insufficient to actuate the first relay but sufficient to actuate the motor is flowing through the latter.

3. A braking system for an elevator comprising a driving motor, a plurality of brakes, solenoids adapted to actuate each of said brakes independently, and current relays respectively in series and in parallel with the motor operative to de-energize said solenoids independently in accordance with the load carried by the elevator so as to effect the application of the brakes either simultaneously or singly.

4. The combination with an elevator driving motor having a main brake actuated by a main solenoid, of an auxiliary brake actuated by an auxiliary solenoid independently of said main brake and means in series with the said auxiliary solenoid adapted to effect the energization of the latter simultaneously with the energization of the driving motor and, under certain predetermined conditions of current required by the driving motor, to maintain said auxiliary solenoid in energized condition for a predetermined time after de-energization of the driving motor.

5. In an elevator braking system, a motor, a pair of independently operable brakes therefor and electrically operative actuating means for said brakes including current relays respectively interconnected in series and in parallel with the motor in such manner that one or both of said brakes are automatically applied to stop the motor upon de-energization thereof in accordance with the quantity of current drawn by the motor just before such de-energization and after it has attained its predetermined operating speed following its period of initial acceleration.

6. A method of braking an elevator comprising the steps of selectively determining, in accordance with the current required to move the elevator, the amount of braking force to be later applied to effect the braking and of then applying the said braking force.

7. A method of braking an elevator comprising the bringing into condition to be operable for braking purposes a predetermined number of independently operating brakes in accordance with the load conditions of said elevator, and then causing the said predetermined number of brakes to operate simultaneously.

8. The method of operating an elevator braking system embodying a driving motor and independently electrically releasable brakes, which comprises effecting the release of all of said brakes simultaneously with the energization of the motor, and then effecting the application of one or more of said brakes in accordance with the current load drawn by the motor after it has attained its predetermined operating speed.

9. The combination with an electric motor, of a brake therefor normally disposed in braking position while the motor is de-energized, means, including a solenoid and a relay interconnected with the motor operative to effect the release of the brake upon the passage through the motor of a current of predetermined strength and to remain in brake-releasing condition so long as said current is flowing through the motor and for a predetermined period thereafter, and another relay interconnected with the solenoid operative to maintain said brake in released position whenever a current of strength insufficient to energize the first mentioned relay but of strength sufficient to actuate the motor is flowing through the latter.

In witness whereof, I have hereunto set my hand this 19th day of January, 1929.

WILLIAM H. MECHLING.